(12) United States Patent
Easterbrook et al.

(10) Patent No.: US 6,886,030 B1
(45) Date of Patent: Apr. 26, 2005

(54) ELECTRONIC MAIL SYSTEM EMPLOYING A LOW BANDWIDTH LINK FOR E-MAIL NOTIFICATIONS

(75) Inventors: Kevin B. Easterbrook, Monument, CO (US); Robert A. Knee, Lansdale, PA (US); Joel G. Hassell, Arvada, CO (US); Michael D. Ellis, Boulder, CO (US)

(73) Assignee: United Video Properties, Inc., Tulsa, OK (US)

( * ) Notice: Subject to any disclaimer, the term of this patent is extended or adjusted under 35 U.S.C. 154(b) by 914 days.

(21) Appl. No.: 09/213,851

(22) Filed: Dec. 17, 1998

Related U.S. Application Data
(60) Provisional application No. 60/096,967, filed on Aug. 18, 1998.

(51) Int. Cl.[7] .............................................. G06F 13/00
(52) U.S. Cl. ...................................................... 709/206
(58) Field of Search ........................... 379/88.12, 88.13, 379/88.15, 93.24; 709/200, 204, 205, 206

(56) References Cited

U.S. PATENT DOCUMENTS

| | | | |
|---|---|---|---|
| 5,014,125 A | 5/1991 | Pocock et al. | 358/86 |
| 5,809,242 A | 9/1998 | Shaw et al. | 395/200.47 |
| 5,812,931 A | 9/1998 | Yuen | 455/5.1 |
| 6,067,561 A | * 5/2000 | Dillon | 709/206 |

FOREIGN PATENT DOCUMENTS

| | | | |
|---|---|---|---|
| CA | 2223337 | 6/1998 | H04L/12/54 |
| EP | 0 704 827 A1 | 4/1996 | G08B/5/22 |
| EP | 0 798 899 A1 | 10/1997 | H04L/12/58 |
| WO | WO 97/01919 | 1/1997 | H04M/11/00 |

OTHER PUBLICATIONS

"Program Notifies You Of E-Mail If You Can Stay Off Of The Phone," *New York Times*, Nov. 19, 1998, p. G3, col. 2.

* cited by examiner

*Primary Examiner*—Robert B. Harrell
(74) *Attorney, Agent, or Firm*—Fish & Neave IP Group of Ropes & Gray LLP

(57) ABSTRACT

An e-mail notification system is provided. The e-mail notification system has a remote e-mail service system and at least one local client device. The e-mail service system is connected to the local client device via a primary communications link, and a secondary relatively low-bandwidth continuous communications link. The primary communications link is preferably bidirectional and has a relatively high bandwidth. Because such links are relatively costly, the primary communications link is not used continuously. The secondary communications link is preferably a low cost unidirectional continuous link. The e-mail service system receives e-mail messages for a user and sends e-mail notifications over the secondary communications link. The local client device generates an appropriate indicator whenever an e-mail notification is received. The local client device may automatically retrieve e-mail messages for the user from the remote e-mail service system via the primary communications link or may provide the user with the opportunity to manually obtain e-mail messages from the remote e-mail service system over the primary communications link.

104 Claims, 6 Drawing Sheets

| CHANNEL | 10:00 PM | 10:30 PM | 11:00 PM |
|---|---|---|---|
| 46 PUBLIC TELEVISION | DESERTS OF AFRICA | WILDLIFE | |
| 47 HBO | TITANIC | | |
| 48 ADU | PPV 1 | PPV 2 | PPV 3 |
| 49 WPTU | COOKING | | | ns
ELECTRONIC MAIL SYSTEM EMPLOYING A LOW BANDWIDTH LINK FOR E-MAIL NOTIFICATIONS

This application claims the benefit of U.S. provisional application No. 60/096,967, filed Aug. 18, 1998.

BACKGROUND OF THE INVENTION

This invention relates to electronic mail ("e-mail") systems, and more particularly, to e-mail systems that notify a user that the user has received e-mail messages.

There are several different models of e-mail delivery used today. In one model, users are connected continuously via a continuous, high-bandwidth network link and receive e-mail messages immediately as the messages are available. In a second model, users are not notified of available e-mail messages, but must connect (typically via a telephone modem) to an e-mail server or other system to retrieve any e-mail messages that may be available. In a third model, users are not notified of available e-mail messages, but must connect to an e-mail server to retrieve e-mail message headers, and then indicate, based on those headers, which e-mail messages to retrieve. In a fourth model, the user's system automatically connects to an e-mail server on a regular basis (typically once per night over a telephone modem) to retrieve e-mail messages or headers.

The drawback of these systems is that continuous high-speed links may be prohibitively expensive for many users, but without a continuous high-speed link users do not know when e-mail messages are available and must establish a telephone modem link to check for e-mail messages. Checking for messages ties up the local telephone line and may burden the user with the cost of the telephone call. Accordingly, it is an object of the present invention to provide an e-mail system that notifies users of received e-mail messages without requiring a continuous high-speed network link or a separate telephone call to establish a modem link.

SUMMARY OF THE INVENTION

This and other objects of the invention are accomplished in accordance with the principles of the present invention by providing an e-mail system that provides e-mail notifications without requiring that a telephone modem link be established to check for e-mail messages.

The e-mail system has an e-mail remote service system (e.g., an e-mail server running a suitable e-mail package) that provides e-mail services to a number of local client devices. The local client devices may be stationary e-mail client systems, such as personal computers with appropriate receivers, cable set-top boxes with suitable processing circuitry and storage, etc. or may be portable, such as notebook computers or personal digital assistants (PDA). The e-mail remote service system may be connected to the client devices via a relatively expensive occasional and typically relatively high-bandwidth bidirectional communications path (e.g., telephone dial-up, Integrated Services Digital Network (ISDN) line, cable modem link, home satellite dish link, T1 line, Internet link, or other link suitable for retrieving e-mail messages fairly rapidly, etc.) and a secondary continuous relatively inexpensive and typically relatively low-bandwidth communications path (e.g., a out-of-band data channel on a cable television service, a data channel implemented over power lines, a suitable wireless connection such as a pager link, or some other link suitable for relatively low cost transmission of notifications to the user in a timely fashion).

The local client device preferably continuously monitors the secondary communications link for e-mail notifications provided by the remote e-mail service system. When a notification is received by the local client device, the local client device may alert the user that an e-mail message is available. Notifications may be sent repeatedly until all of the e-mail messages have been retrieved by the user or by the local client device. Upon receiving a notification, the user may initiate an e-mail session with the remote e-mail service system over the primary communications link to retrieve the e-mail messages and store them locally for later review. Alternatively, the local client device may automatically initiate the e-mail session and retrieve and store the e-mail messages.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
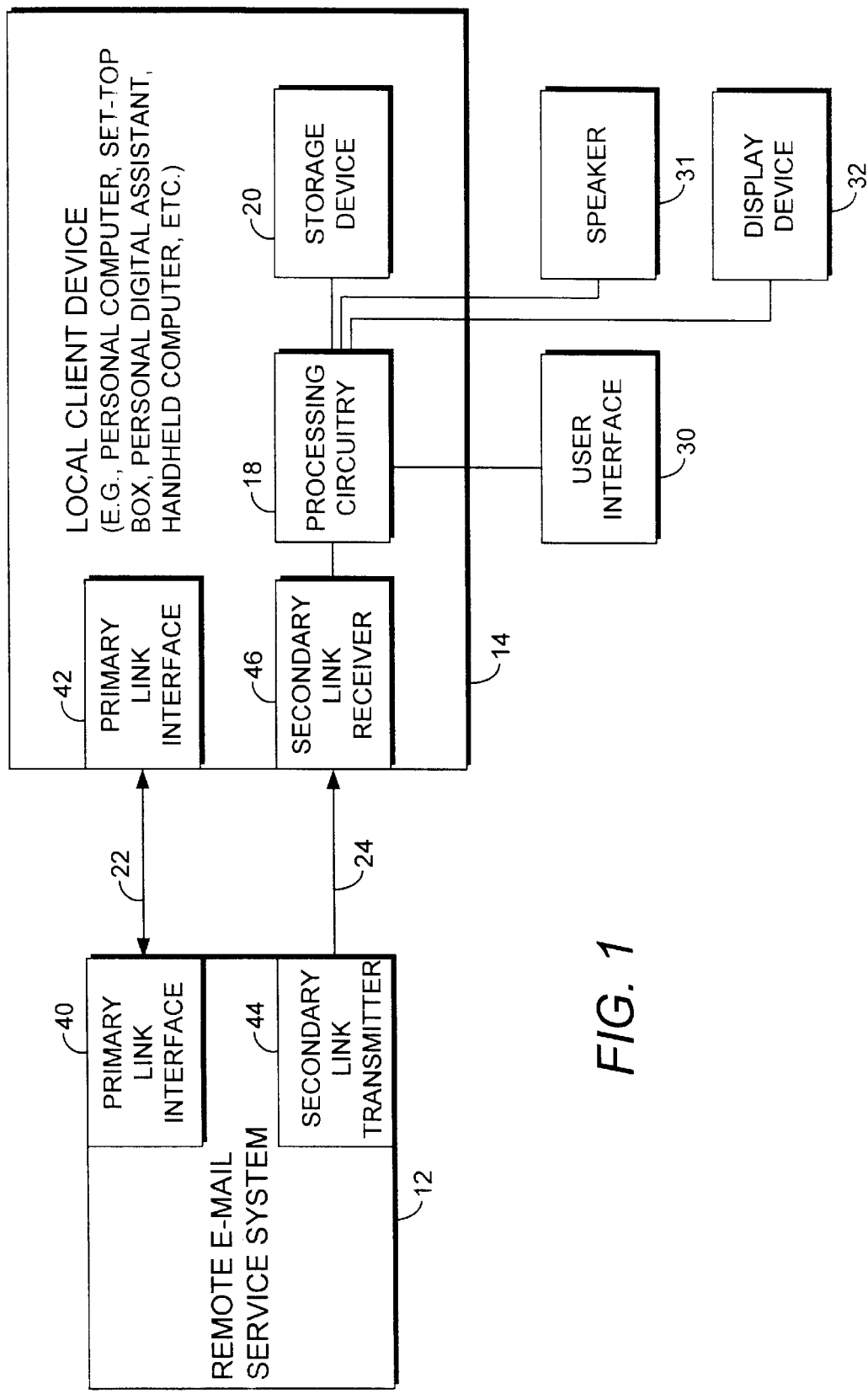
FIG. 1 is a schematic block diagram of an illustrative system in accordance with the present invention.

An illustrative e-mail system in accordance with the present invention is shown in FIG. 1. E-mail system may include remote e-mail service system 12 and local client device 14. There may be a number of local client devices 14, but only one has been drawn to avoid over-complicating the drawing. Remote e-mail service system 12 may be implemented using any suitable e-mail hardware and software. Remote e-mail service system 12 may, for example, be a computer running Windows NT and a suitable e-mail server application. Remote e-mail service system 12 may also be connected to other e-mail service systems over suitable computer network links (e.g., Internet connections).

Local client device 14 may be implemented using any suitable hardware and software, that is capable of providing e-mail services (e.g., message notification, retrieving and viewing messages, generating and sending messages, etc.). Local client device 14 may, for example, be a stationary device or system such as a personal computer, a cable set-top box with suitable processing circuitry, or other suitable stationary device or system. Local client device 14 may also, for example, be a portable device, such as a notebook computer, a personal digital assistant, a handheld computer, or other suitable portable device. In addition to providing e-mail notifications and retrieval functionality, a portable local client device 14 may also have suitable circuitry for receiving pages or other data transmitted by a paging service over a paging frequency (e.g., a pager), or may have suitable circuitry and other hardware for sending and receiving telephone calls (e.g., a mobile phone).

Local client device 14 may have processing circuitry 18 and storage device 20 for providing the e-mail services. Processing circuitry 18 may be any suitable processing circuitry, and may include any suitable microprocessor, memory, input-output control circuitry, video generation circuitry, etc. Optional storage device 20 may be any suitable storage device such as a suitable memory, hard disk drive, floppy disk drive, etc. Local client device may also have user interface 30, speaker 31, and display device 32. User interface 30 may be a pointing device, wireless remote control, keyboard, touch-pad, voice recognition system, or any other suitable user input device for obtaining commands from the user. Display device 32 may be a television, monitor, liquid crystal display (LCD), or any other suitable display device.

Remote e-mail service system 12 and local client device 14 may be connected via primary communications link 22 and secondary communications link 24. Primary communications link 22 may be any communications link suitable for carrying communications between remote e-mail service system 12 and local client device 14. Primary communications link 22 preferably has a relatively high bandwidth, and can support bidirectional communications between remote e-mail service system 12 and local client device 14. Because such links are typically costly, primary communications link 22 preferably provides communications between remote e-mail service system 12 and local client device 14 only occasionally when communications over primary communications link 22 are necessary for reasons other than providing e-mail notifications (e.g., message retrieval, sending messages, etc.). Primary communications link 22 may, for example, be a satellite link, a telephone network link, an Integrated Services Digital Network (ISDN) link, a cable modem link, a cable or fiber optic link using any suitable communications protocols, a microwave link, a T1 link, an Internet link, a combination of such links, or any other suitable communications path.

Secondary communications link 24 may be any suitable low cost continuous analog or digital link (typically having a relatively low bandwidth) that is suitable for providing e-mail notifications from remote e-mail service system 12 to local client device 14 without the need of placing a telephone call to establish a modem link or requiring an expensive continuous communications path. Secondary communications link 24 may be unidirectional. Secondary communications link 24 may be separate from primary communications link 22 as shown, or may be an out-of-band channel or other co-existing channel on the same physical path as primary communications link 22. Secondary communications link 24 may, for example, be a unidirectional wireless communications link (e.g., a radio transmission), a data path provided over electric power wires, a link established on a television channel sideband, a link using the vertical blanking interval of a television channel, an in-band digital television channel, an out-of-band digital television channel, or any other suitable data link.

Remote e-mail service system 12 and local client device 14 may have primary link interfaces 40 and 42 respectively. Primary link interfaces 40 and 42 may be any interface devices suitable for providing transmissions over primary communications link 22 (e.g., modems connected over a suitable telephone dial-up or wireless link, ISDN modems and terminal equipment connected over a suitable ISDN line, a cable service transmitter and a cable service receiver in a set-top box, an Internet access circuitry in a set-top box with a cable modem connected to a cable access provider, etc.).

Remote e-mail service system 12 may also have secondary communications link transmitter 44 for transmitting e-mail notifications across secondary communications link 24 to secondary communications link receiver 46 of local client device 14. Secondary communications link transmitter 44 and secondary communications link receiver 46 may be any transmitter-receiver pair suitable for sending e-mail notifications over secondary communications link 24. Secondary communications link transmitter 44 and receiver 46 may, for example, use any modulation scheme suitable for transmitting and receiving digital or analog signals over electric power lines, over a cable television cable, over the air, etc.

Remote e-mail service system 12 receives e-mail messages for its users from other e-mail service systems using any suitable e-mail scheme (e.g., over the Internet, private network, etc.). When messages for its users are received, remote e-mail service system 12 generates an e-mail notification message for transmission over secondary communications link 24. Any messaging scheme suitable for a unidirectional communications path may be used (e.g., sending sockets using a user data protocol (UDP) and Internet protocol (IP) stack (UDP/IP), sending packets using a packet exchange protocol (PXP) and Internet packet exchange protocol (IPX) stack (PXP/IPX), sending network control blocks using NetBIOS session Datagram Service message datagrams, a Moving Pictures Experts Group MPEG-2 private data stream, etc.). E-mail notification messages are preferably addressed to the particular local client device for which the notification message is intended using any suitable addressing scheme. The addressing scheme may work at any layer of the protocol stack of the system (e.g., issuing the message to a particular medium access control (MAC) layer address or to a socket address).

E-mail notifications containing information on whether there are any new messages or not may be sent to local client devices 14 periodically with a regular or varying frequency depending on a number of criteria. Remote e-mail service system 12 may consider the time the most recent e-mail message was received, the time the most recent e-mail notification was sent to a particular local client device 14, the last time the particular local client device 14 retrieved e-mail messages, the number of new e-mail messages available at remote e-mail service system 12 for the particular local client device, or other suitable criteria. For example, if a new message was received recently, a notification may be sent during a suitable time slot in a transmission period, and then repeated if necessary for each such period (e.g., every thirty minutes). If a notification has been sent repeatedly, it may then be resent every few periods (e.g., every few hours). If no new e-mail messages are available or if the user has connected since the most recent e-mail message was received, e-mail notifications may be sent once per day. These transmission schemes are only illustrative. Notifications may be sent with any suitable frequency of distribution if desired.

Local client device 14 preferably monitors secondary communications link 24 continuously for e-mail notifications. When a notification is received by secondary link receiver 46, it is passed to processing circuitry 18 for processing. Processing circuitry 18 may alert the user using speaker 31 or display device 32, that a notification has been received. Indications that may be made to alert the user using speaker 31 may be any suitable audible alarm or indicator (e.g., a continuous or periodic beep, verbal message, etc.). Processing circuitry 18 may, for example, include suitable voice synthesis circuitry for generating audible indicators that indicate a user has new mail, how many messages have been received, how many new and old messages are available, how many messages are available for a number of users, or any other suitable indication.

Figure 2:
FIG. 2 is an illustrative program display screen showing the presence of a notification that e-mail has been received in accordance with an embodiment of the present invention.

Indications that may be made using display device 32 may take any form suitable for local client device 14. FIGS. 2 and 3a–3c show illustrative indications that may be used, but any suitable icon, dialog box, notice, message or other visual indication may be used. FIG. 2 shows the use of a sample indicator, flag indicator 100. Flag indicator 100 is preferably displayed on display device 32 where it may be brought to the attention of the user. If display device 32 is a television and local client device 14 is a suitable cable set-top box, for example, flag indicator 100 may be overlaid over television programs. Flag indicator 100 may be overlaid over any program tuned to by the user. FIG. 2 illustrates overlaying flag indicator 100 over a television program guide screen displayed as part of an electronic program guide service. If desired, flag indicator 100 or other such suitable indicator may be overlaid on top of an application display screen such as the television program guide display screen shown in FIG. 2.

Figure 3A:
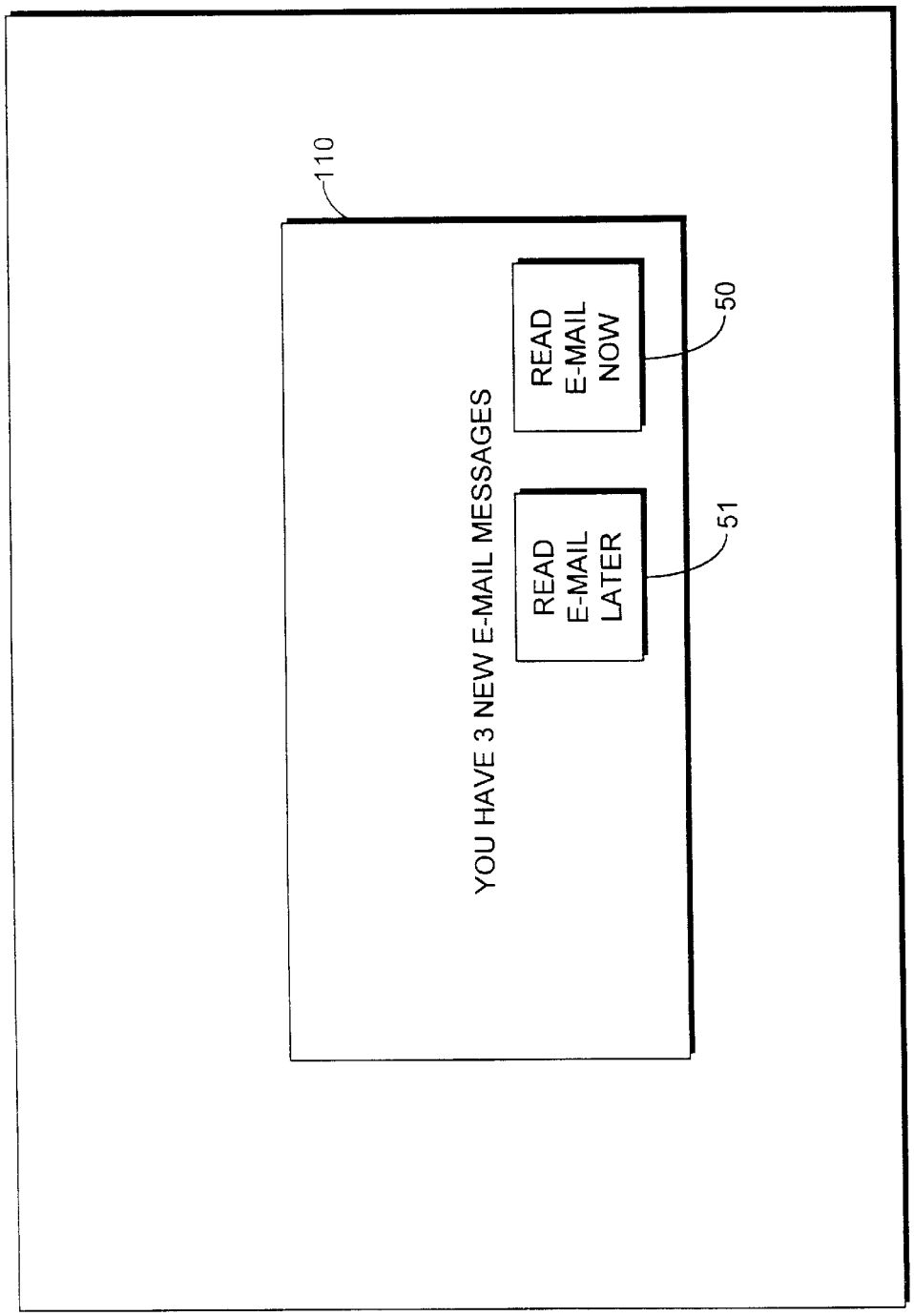
FIGS. 3a, 3B, and 3C are illustrative display screens in accordance with another embodiment of the present invention.
Figure 3B:
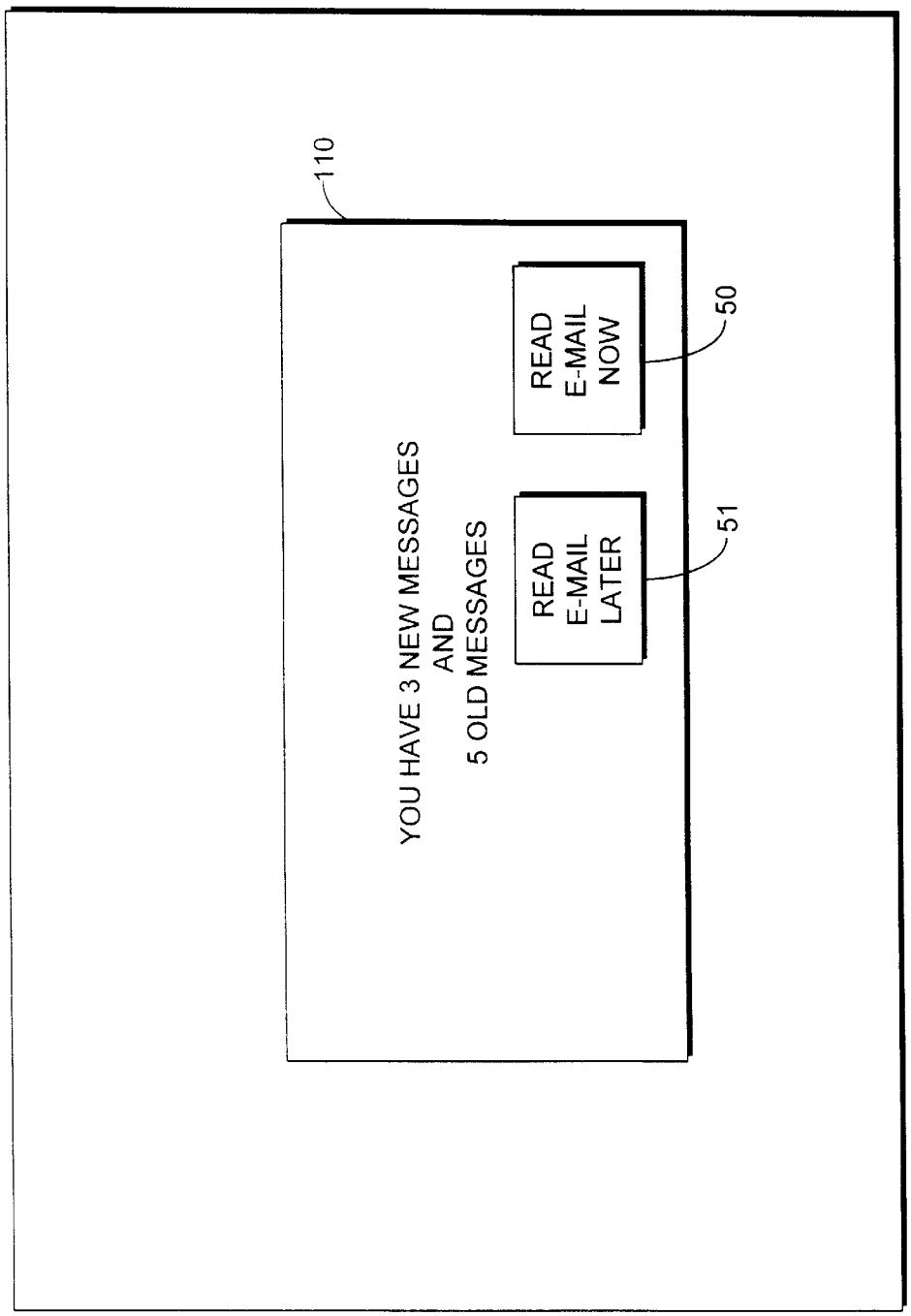
Figure 3C:
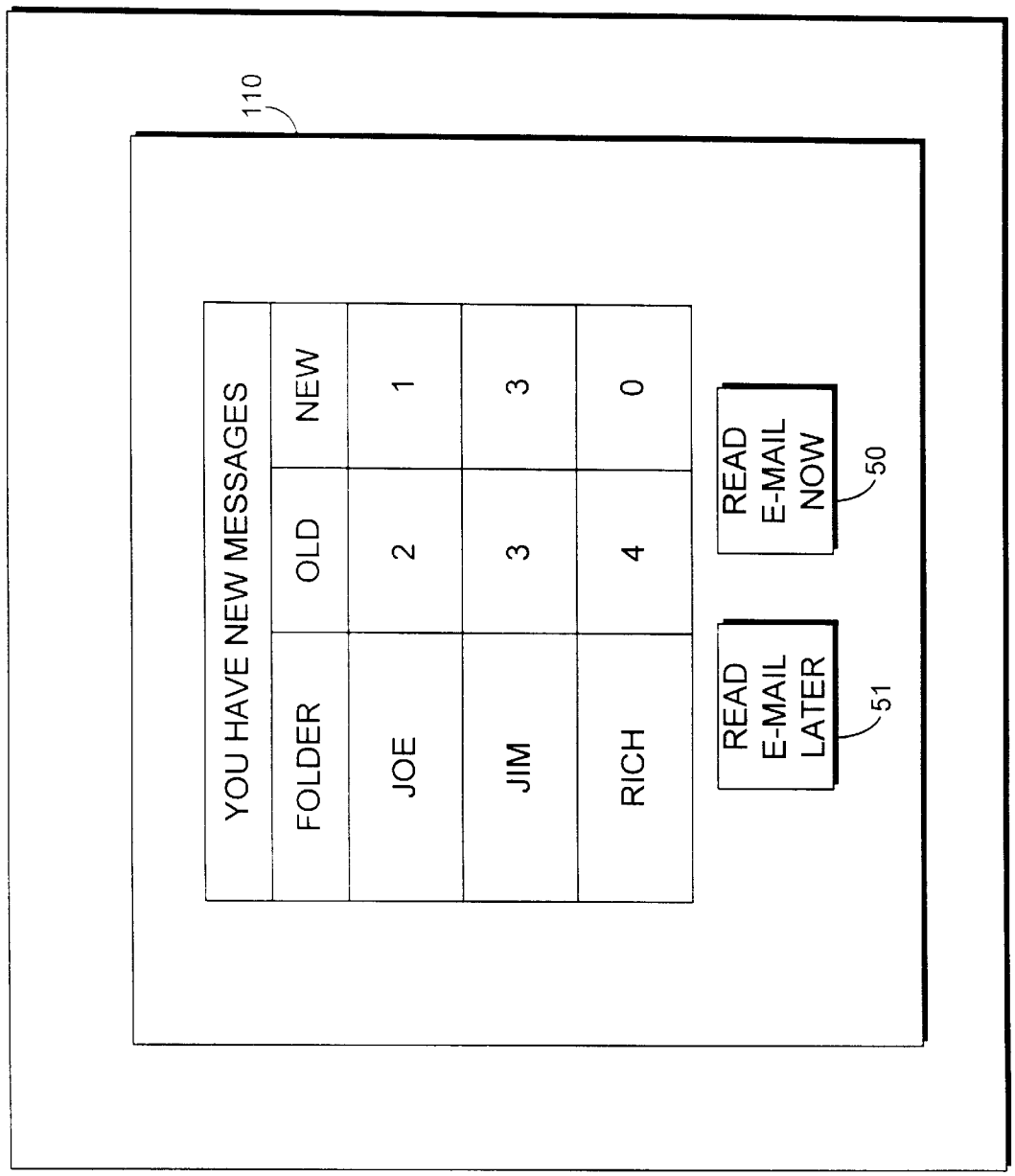

FIGS. 3a–3c show the use of another type of illustrative indicator 110 for alerting to the user that new e-mail messages have been received. Indicator 110 may be a pop-up window, or other suitable graphical image that is overlaid on the television display screen. Indicator 110 may indicate how many messages have been received (FIG. 3a), may indicate how many new and old messages are associated with the user (FIG. 3b), or may list the new and old messages associated with a number of users or e-mail folders (FIG. 3c). Indicator 110 may include a graphical interface that the user may select to remove indicator 110 from the display and return to the previous screen (e.g., personal computer software application screen, television screen containing television programming, etc.) or to allow the user to retrieve e-mail messages over primary communications link 22 if local client device 14 has not already done so. FIGS. 3a–3c show the use of a graphical interface in the form of buttons 50 and 51, but any suitable interface may be used.

Figure 4:
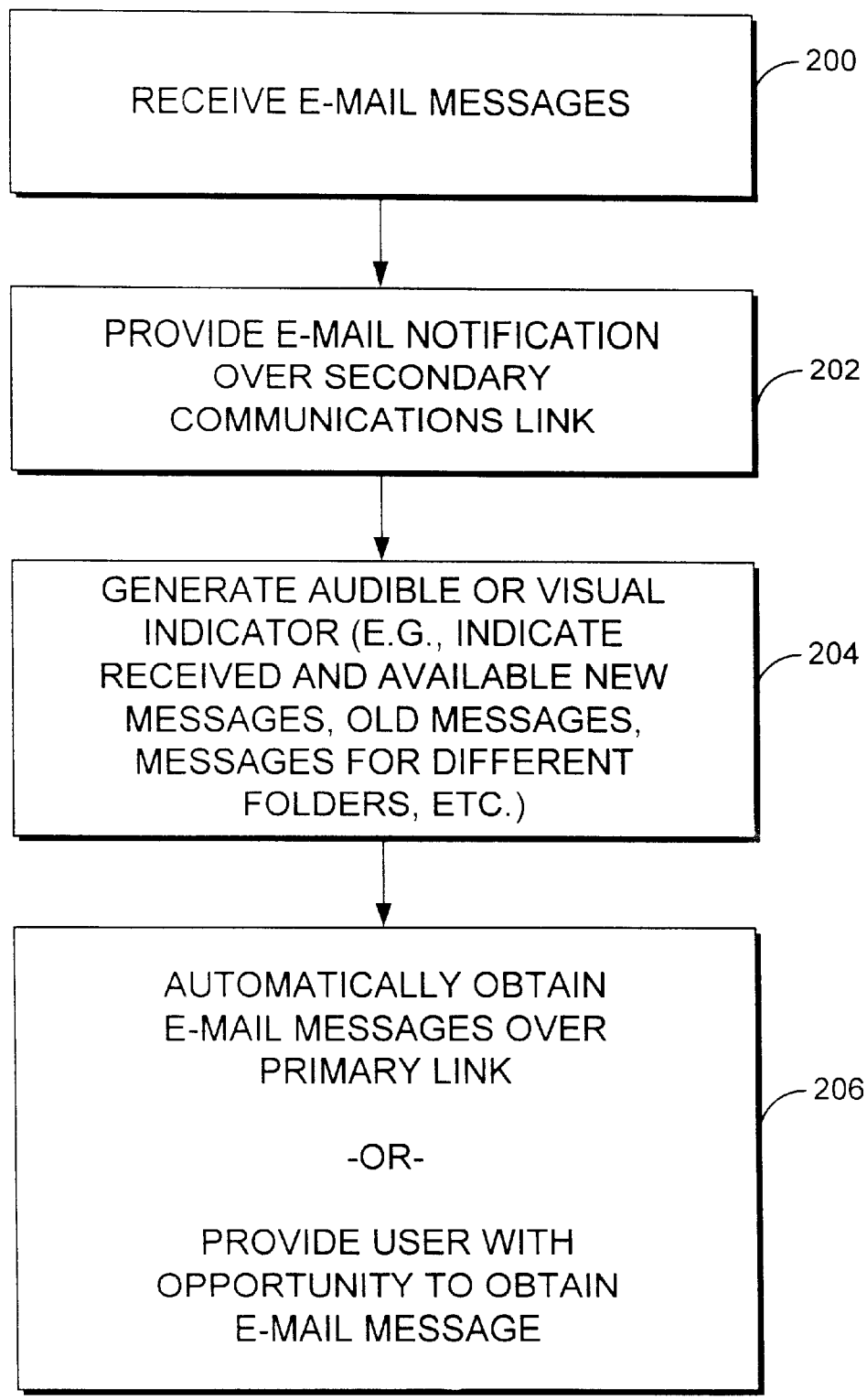
FIG. 4 is a flow chart of illustrative steps involved in operating the system of the present invention.

FIG. 4 is a flow chart of illustrative steps involved in the operation of the e-mail notification system of FIG. 1. At step 200, e-mail messages are received by remote e-mail service system 12. At step 202, remote e-mail service system 12 provides e-mail notifications over secondary communications link 24 using a suitable communications scheme and a suitable addressing scheme. Notifications may be sent once or multiple times and may be sent periodically or at various times depending on a number of criteria (e.g., the time the most recent notification was sent, the last time local client device 14 retrieved e-mail messages, the number of new e-mail messages available, etc.).

At step 204, local client device 14 may generate an audible indicator using speaker 31 or a visible indicator using display device 32 that indicates to the user that an e-mail notification has been received. The indicator may be any suitable visual or audible indicator, such as a periodic alarm, synthesized voice indicator, an icon or other graphical indicator, etc. The indicator may indicate that a new message has been received, the number of new messages, and the number of old messages. The indicator may also display this information for a number of users or folders.

At step 206, local client device 14 obtains the e-mail messages from remote e-mail service system 12 via primary communications link 22. Local client device 14 may obtain the messages automatically once an e-mail notification is received, or may provide the user with the opportunity to direct local client device 14 to obtain the user's e-mail messages.

The foregoing is merely illustrative of the principles of this invention and various modifications can be made by those skilled in the art without departing from the scope and spirit of the invention.

What is claimed is:

1. An e-mail notification and messaging system for providing e-mail messages and e-mail notifications from an e-mail service system to local client devices of a plurality of users, the system comprising:
    an e-mail service system configured to receive e-mail messages for a plurality of users and configured to provide e-mail notifications and e-mail messages to the local client devices of the plurality of users;
    a given local client device from among the local client devices that is configured to receive e-mail notifications from the e-mail service system and that is configured to retrieve e-mail messages from the e-mail service system;
    a first communications link over which the local client device retrieves e-mail messages from the e-mail service system; and
    a second communications link separate from the first communications link over which the e-mail service system provides e-mail notifications to the local client device, wherein the second communications link is a low bandwidth communications link.

2. The system defined in claim 1 wherein the local client device comprises:
    an interface device configured to retrieve e-mail messages from the e-mail service system over the first communications link; and
    a receiver configured to receive e-mail notifications provided by the e-mail service system over the second communications link.

3. The system defined in claim 2 wherein the local client device comprises a stationary e-mail client system.

4. The system defined in claim 3 wherein the local client device further comprises means for indicating to a user that an e-mail notification has been received by the local client device.

5. The system defined in claim 4 wherein the local client device has a speaker, and wherein the means for indicating to the user that an e-mail notification has been received by the local client device further comprises means for generating an audible indicator with the speaker.

6. The system defined in claim 5 wherein the means for generating an audible indicator further comprises means for indicating how many new e-mail messages have been received by the e-mail service system for the user.

7. The system defined in claim 5 wherein the means for generating an audible indicator further comprises means for indicating how many e-mail messages are available to the user.

8. The system defined in claim 5 wherein the means for generating an audible indicator further comprises means for indicating how many e-mail messages are available for each of a plurality of users.

9. The system defined in claim 4 wherein the local client device has a display device and wherein the means for indicating to the user that an e-mail notification has been received by the local client device further comprises means for displaying a visible indicator on the display device.

10. The system defined in claim 9 wherein the means for displaying the visible indicator on the display device further comprises means for indicating how many new e-mail messages have been received by the e-mail service system for the user.

11. The system defined in claim 9 wherein the means for displaying the visible indicator on the display device further comprises means for indicating how many e-mail messages are available to the user.

12. The system defined in claim 9 wherein the means for displaying the visible indicator on the display device further comprises means for indicating how many e-mail messages are available for each of a plurality of users.

13. The system defined in claim 4 wherein the e-mail service system is configured to provide e-mail notifications to the local client devices of a plurality of users based on the time the most recent e-mail message was received by the e-mail service system for a given user.

14. The system defined in claim 4 wherein the e-mail service system is configured to provide e-mail notifications to the local client devices of a plurality of users based on the time the most recent e-mail notification message was provided by the e-mail service system to the local client device.

15. The system defined in claim 4 wherein the e-mail service system is configured to provide e-mail notifications to the local client devices of a plurality of users based on the last time the local client device retrieved e-mail messages from the e-mail service system.

16. The system defined in claim 4 wherein the e-mail service system is configured to provide e-mail notifications to the local client devices of a plurality of users based on how many new e-mail messages are available for the local client device.

17. The system of claim 3 wherein the second communications link comprises a wireless communications path.

18. The system of claim 3 wherein the second communications link comprises a power line.

19. The system of claim 3 wherein the second communications link comprises a cable television system cable.

20. The system of claim 3 wherein the local client device comprises a personal computer.

21. The system of claim 3 wherein the local client device comprises:
a set-top box; and
a television.

22. The system defined in claim 3 wherein the local client device further comprises means for automatically retrieving an e-mail message from the e-mail service system over the first communications link after an associated e-mail notification has been provided by the e-mail service system over the second communications link.

23. The system defined in claim 3 wherein the local client device further comprises means for providing a user with the opportunity to retrieve an e-mail message from the e-mail service system over the first communications link after an associated e-mail notification has been provided by the e-mail service system over the second communications link.

24. The system defined in claim 2 wherein the local client device comprises a portable e-mail client device.

25. The system defined in claim 24 wherein the local client device further comprises means for indicating to a user that an e-mail notification has been received by the local client device.

26. The system defined in claim 25 wherein the local client device has a speaker and wherein the means for indicating to the user that an e-mail notification has been received by the local client device further comprises means for generating an audible indicator with the speaker.

27. The system defined in claim 26 wherein the means for generating an audible indicator further comprises means for indicating how many new e-mail messages have been received by the e-mail service system for the user.

28. The system defined in claim 26 wherein the means for generating an audible indicator further comprises means for indicating how many e-mail messages are available to the user.

29. The system defined in claim 26 wherein the means for generating an audible indicator further comprises means for indicating how many e-mail messages are available for each of a plurality of users.

30. The system defined in claim 25 wherein the local client device has a display device and wherein the means for indicating to the user that an e-mail notification has been received by the local client device further comprises means for displaying a visual indicator on the display device.

31. The system defined in claim 30 wherein the means for displaying the visual indicator on the display device further comprises means for indicating how many new e-mail messages have been received by the e-mail service system for the user.

32. The system defined in claim 30 wherein the means for displaying the visible indicator on the display device further comprising means for indicating how many e-mail messages are available to the user.

33. The system defined in claim 30 wherein the means for displaying the visible indicator on the display device further comprises means for indicating how many e-mail messages are available for each of a plurality of users.

34. The system defined in claim 25 wherein the e-mail service system is configured to provide e-mail notifications to the local client devices of a plurality of users based on the time the most recent e-mail message was received by the e-mail service system for a given user.

35. The system defined in claim 25 wherein the e-mail service system is configured to provide e-mail notifications to the local client devices of a plurality of users based on the time the most recent e-mail notification message was provided by the e-mail service system to a local client device.

36. The system defined in claim 25 wherein the e-mail service system is configured to provide e-mail notifications to the local client devices of a plurality of users based on the last time the local client device retrieved e-mail messages from the e-mail service system.

37. The system defined in claim 25 wherein the e-mail service system is configured to provide e-mail notifications to the local client devices of a plurality of users based on and how many new e-mail messages are available for the local client device.

38. The system of claim 24 wherein the second communications link comprises a wireless communications path.

39. The system of claim 24 wherein the second communications link comprises a power line.

40. The system of claim 24 wherein the second communications link comprises a cable television system cable.

41. The system of claim 24 wherein the local client device comprises a portable computer.

42. The system of claim 24 wherein the local client device comprises a personal digital assistant.

43. The system of claim 24 wherein the local client device comprises a handheld computer.

44. The system of claim 24 wherein the local client device comprises means for receiving pages.

45. The system of claim 24 wherein the local client device comprises means for receiving and placing telephone calls.

46. The system defined in claim 24 wherein the local client device further comprises means for automatically retrieving an e-mail message from the e-mail service system over the first communications link after an associated e-mail notification has been provided by the e-mail service system over the second communications link.

47. The system defined in claim 24 wherein the local client device further comprises means for providing a user with the opportunity to retrieve an e-mail message from the e-mail service system over the first communications link after an associated e-mail notification has been provided by the e-mail service system over the second communications link.

48. The system defined in claim 1 wherein:

the e-mail messages are retrieved over the first communications link using a first bandwidth;

the e-mail notifications are provided over the second communications links using a second bandwidth; and the first bandwidth is greater than the second bandwidth.

49. The system defined in claim 1 wherein the first communications link is bidirectional and the second communications link is unidirectional.

50. The system defined in claim 1 wherein the second communications link is unidirectional.

51. The system defined in claim 1 wherein the first communications link is an occasional link.

52. The system defined in claim 1 wherein the second communications link is a continuous link.

53. The system defined in claim 1 wherein:

the e-mail messages are retrieved over the first communications link using a first bandwidth;

the e-mail notifications are provided over a second communications link using a second bandwidth;

the first bandwidth is greater than the second bandwidth;

the first communications link is a bidirectional occasional link; and the second communications link is a continuous unidirectional communications link.

54. The system defined in claim 1 wherein the e-mail service system comprises:

an interface configured to provide e-mail messages to the local client device over the first communications link when retrieved by the given local client device; and a transmitter configured to transmit the e-mail notifications to the given local client device over the second communications link.

55. A method for providing e-mail messages from an e-mail service system to local client devices of a plurality of users over a first communications link and providing e-mail notifications from the e-mail service system to the local client devices over a second communications link, the method comprising the steps of:

receiving e-mail messages at the e-mail service system;

providing e-mail notifications from the e-mail service system to a given local client device from among the local client devices over the second communications link;

receiving the e-mail notifications at the given local client device from the e-mail service system over the second communications link, wherein the second communications link is a low bandwidth communications link; and retrieving e-mail messages at the given local client device from the e-mail service system over the first communications link.

56. The method defined in claim 55 wherein:

the given local client device comprises a stationary e-mail client system;

the step of providing e-mail notifications from the e-mail service system to the given local client device over the second communications link comprises the step of providing e-mail notifications from the e-mail service system to the stationary e-mail client system over the second communications link;

the step of receiving the e-mail notifications at the given local client device from the e-mail service system over the second communications link comprises the step of receiving the e-mail notifications at the stationary e-mail client system over the second communications link; and the step of retrieving e-mail messages at the given local client device from the e-mail service system over the first communications link comprises the step of retrieving e-mail messages at the stationary e-mail client system from the e-mail service system over the first communications link.

57. The method defined in claim 56 further comprising the step of indicating to a user that an e-mail notification has been received by the local client device.

58. The method defined in claim 57 wherein the local client device has a speaker, and wherein the step of indicating to the user that an e-mail notification has been received by the local client device further comprises the step of generating an audible indicator with the speaker.

59. The method defined in claim 58 wherein the step of generating an audible indicator with the speaker further comprises the step of indicating how many new e-mail messages have been received by the e-mail service system for the user.

60. The method defined in claim 58 wherein the step of generating an audible indicator with the speaker further comprises the step of indicating how many e-mail messages are available to the user.

61. The method defined in claim 58 wherein the step of generating an audible indicator with the speaker further comprises the step of indicating how many e-mail messages are available for each of a plurality of users.

62. The method defined in claim 57 wherein the local client device has a display device and wherein the step of indicating to the user that an e-mail notification has been received by the given local client device further comprises the step of displaying a visible indicator on the display device.

63. The method defined in claim 62 wherein the step of displaying the visible indicator on the display device further comprises the step of indicating how many new e-mail messages have been received by the e-mail service system for the user.

64. The method defined in claim 62 wherein the step of displaying the visible indicator on the display device further comprises the step of indicating how many e-mail messages are available to the user.

65. The method defined in claim 62 wherein the step of displaying the visible indicator on the display device further comprises the step of indicating how many e-mail messages are available for each of a plurality of users.

66. The method defined in claim 57 wherein the step of providing e-mail notifications from the e-mail service system to the given local client device over a second communications link comprises the step of providing e-mail notifications to the given local client device based on the time the most recent e-mail message was received by the e-mail service system for a given user.

67. The method defined in claim 57 wherein the step of providing e-mail notifications from the e-mail service system to the given local client device over a second communications link comprises the step of providing e-mail notifications to the given local client device based on the time the most recent e-mail notification message was provided by the e-mail service system to the local client device.

68. The method defined in claim 57 wherein the step of providing e-mail notifications from the e-mail service system to the given local client device over a second communications link comprises the step of providing e-mail notifications to the given local client device based on the last time the local client device retrieved e-mail messages from the e-mail service system.

69. The method defined in claim 57 wherein the step of providing e-mail notifications from the e-mail service system to the given local client device over a second communications link comprises the step of providing e-mail notifications to the given local client device based on how many new e-mail messages are available for the local client device.

70. The method of claim 56 wherein:
the second communications link comprises a wireless communications path;
the step of providing e-mail notifications from the e-mail service system to the given local client device from among the local client devices over the second communications link comprises the step of providing e-mail notifications from the e-mail service system to the given local client device over a wireless communications path; and
the step of receiving the e-mail notifications at the given local client device from the e-mail service system over the second communications link comprises the step of receiving the e-mail notifications at the given local client device over the wireless communications path.

71. The method of claim 56 wherein:
the second communications link comprises a power line;
the step of providing e-mail notifications from the e-mail service system to the given local client device from among the local client devices over the second communications link comprises the step of providing e-mail notifications from the e-mail service system to the given local client device over a power line; and
the step of receiving the e-mail notifications at the given local client device from the e-mail service system over the second communications link comprises the step of receiving the e-mail notifications at the given local client device over a power line.

72. The method of claim 56 wherein:
the second communications link comprises a cable television system cable;
the step of providing e-mail notifications from the e-mail service system to the given local client device from among the local client devices over the second communications link comprises the step of providing e-mail notifications from the e-mail service system to the given local client device over a cable television system cable; and
the step of receiving the e-mail notifications at the given local client device from the e-mail service system over the second communications link comprises the step of receiving the e-mail notifications at the given local client device over a cable television system cable.

73. The method of claim 56 wherein:
the local client device comprises a personal computer;
the step of providing e-mail notifications from the e-mail service system to the given local client device from among the local client devices over the second communications link comprises the step of providing e-mail notifications from the e-mail service system to a personal computer over the second communications link;
the step of receiving the e-mail notifications at the given local client device from the e-mail service system over the second communications link comprises the step of receiving the e-mail notifications at a personal computer from the e-mail service system over the second communications link; and
the step of retrieving e-mail messages at the given local client device from the e-mail service system over the first communications link comprises the step of retrieving e-mail messages at a personal computer from the e-mail service system over the first communications link.

74. The method of claim 56 wherein:
the local client device comprises:
a set-top box; and
a television;
the step of providing e-mail notifications from the e-mail service system to a given local client device from among the local client devices over the second communications link comprises the step of providing e-mail notifications from the e-mail service system to a set-top box over the second communications link;
the step of receiving the e-mail notifications at the given local client device from the e-mail service system over the second communications link comprises the step of receiving the e-mail notifications at a set-top box from the e-mail service system over the second communications link; and
the step of retrieving e-mail messages at the given local client device from the e-mail service system over the first communications link comprises the step of retrieving e-mail messages at a set-top box from the e-mail service system over the first communications link.

75. The method defined in claim 56 wherein the step of retrieving e-mail messages at the given local client device from the e-mail service system over the first communications link further comprises the step of automatically retrieving an e-mail message at the given local client device from the e-mail service system over the first communications link after an associated e-mail notification has been provided by the e-mail service system over the second communications link.

76. The method defined in claim 56 wherein the step of retrieving e-mail messages at the given local client device from the e-mail service system over the first communications link further comprises the step of providing a user with the opportunity to retrieve an e-mail message at the given local client device from the e-mail service system over the first communications link after an associated e-mail notification has been provided by the e-mail service system over the second communications link.

77. The method defined in claim 55 wherein:
the local client device comprises a portable e-mail client device;
the step of providing e-mail notifications from the e-mail service system to the given local client device over the second communications link comprises the step of providing e-mail notifications from the e-mail service system to the portable e-mail client device over the second communications link;
the step of receiving the e-mail notifications at the given local client device from the e-mail service system over the second communications link comprises the step of receiving the e-mail notifications at the portable e-mail client device over the second communications link; and
the step of retrieving e-mail messages at the given local client device from the e-mail service system over the first communications link comprises the step of retrieving e-mail messages at the portable e-mail client device from the e-mail service system over the first communications link.

78. The method defined in claim 77 further comprising the step of indicating to a user that an e-mail notification has been received by the local client device.

79. The method defined in claim 78 wherein the local client device has a speaker and wherein the step of indicating to the user that an e-mail notification has been received by the local client device further comprises the step of generating an audible indicator with the speaker.

80. The method defined in claim 79 wherein the step of generating an audible indicator with the speaker further comprises the step of indicating how many new e-mail messages have been received by the e-mail service system for the user.

81. The method defined in claim 79 wherein the step of generating an audible indicator with the speaker further comprises the step of indicating how many e-mail messages are available to the user.

82. The method defined in claim 79 wherein the step of generating an audible indicator with the speaker further comprises the step of indicating how many e-mail messages are available for each of a plurality of users.

83. The method defined in claim 78 wherein the local client device has a display device and wherein the step of indicating to the user that an e-mail notification has been received by the local client device further comprises the step of displaying a visual indicator on the display device.

84. The method defined in claim 83 wherein the step of displaying the visual indicator on the display device further comprises the step of indicating how many new e-mail messages have been received by the e-mail service system for the user.

85. The method defined in claim 83 wherein the step of displaying the visible indicator on the display device further comprises the step of indicating how many e-mail messages are available to the user.

86. The method defined in claim 83 wherein the step of displaying the visible indicator on the display device further comprises the step of indicating how many e-mail messages are available for each of a plurality of users.

87. The method defined in claim 78 wherein the step of providing e-mail notifications from the e-mail service system to the given local client device over a second communications link comprises the step of providing e-mail notifications to the given local client device based on the time the most recent e-mail message was-received by the e-mail service system for a given user.

88. The method defined in claim 78 wherein the step of providing e-mail notifications from the e-mail service system to the given local client device over a second communications link comprises the step of providing e-mail notifications to the given local client device based on the time the most recent e-mail notification message was provided by the e-mail service system to the local client device.

89. The method defined in claim 78 wherein the step of providing e-mail notifications from the e-mail service system to the given local client device over a second communications link comprises the step of providing e-mail notifications to the given local client device based on the last time the local client device retrieved e-mail messages from the e-mail service system.

90. The method defined in claim 78 wherein the step of providing e-mail notifications from the e-mail service system to the given local client device over a second communications link comprises the step of providing e-mail notifications to the given local client device based on how many new e-mail messages are available for the local client device.

91. The method of claim 77 wherein:
the second communications link comprises a wireless communications path;
the step of providing e-mail notifications from the e-mail service system to the given local client device from among the local client devices over the second communications link comprises the step of providing e-mail notifications from the e-mail service system to the given local client device over a wireless communications path; and
the step of receiving the e-mail notifications at the given local client device from the e-mail service system over the second communications link comprises the step of receiving the e-mail notifications at the given local client device over a wireless communications path.

92. The method of claim 77 wherein:
the second communications link comprises a power line;
the step of providing e-mail notifications from the e-mail service system to the given local client device from among the local client devices over the second communications link comprises the step of providing e-mail notifications from the e-mail service system to the given local client device over a power line; and
the step of receiving the e-mail notifications at the given local client device from the e-mail service system over the second communications link comprises the step of receiving the e-mail notifications at the given local client device over a power line.

93. The method of claim 77 wherein:
the second communications link comprises a cable television system cable;
the step of providing e-mail notifications from the e-mail service system to the given local client device from among the local client devices over the second communications link comprises the step of providing e-mail notifications from the e-mail service system to the given local client device over a cable television system cable; and
the step of receiving the e-mail notifications at the given local client device from the e-mail service system over the second communications link comprises the step of receiving the e-mail notifications at the given local client device over a cable television system cable.

94. The method of claim 77 wherein:
the local client device comprises a portable computer;
the step of providing e-mail notifications from the e-mail service system to the given local client device from among the local client devices over the second communications link comprises the step of providing e-mail notifications from the e-mail service system to a portable computer over the second communications link;
the step of receiving the e-mail notifications at the given local client device from the e-mail service system over the second communications link comprises the step of receiving the e-mail notifications at a portable computer from the e-mail service system over the second communications link; and
the step of retrieving e-mail messages at the given local client device from the e-mail service system over the first communications link comprises the step of retrieving e-mail messages at a portable computer from the e-mail service system over the first communications link.

95. The method of claim 77 wherein:
the local client device comprises a personal digital assistant;
the step of providing e-mail notifications from the e-mail service system to the given local client device from among the local client devices over the second communications link comprises the step of providing e-mail notifications from the e-mail service system to a personal digital assistant over the second communications link;
the step of receiving the e-mail notifications at the given local client device from the e-mail service system over the second communications link comprises the step of receiving the e-mail notifications at a personal digital assistant from the e-mail service system over the second communications link; and
the step of retrieving e-mail messages at the given local client device from the e-mail service system over the first communications link comprises the step of retrieving e-mail messages at a personal digital assistant from the e-mail service system over the first communications link.

96. The method of claim 77 wherein:
the local client device comprises a handheld computer;
the step of providing e-mail notifications from the e-mail service system to the given local client device from among the local client devices over the second communications link comprises the step of providing e-mail notifications from the e-mail service system to a handheld computer over the second communications link;
the step of receiving the e-mail notifications at the given local client device from the e-mail service system over the second communications link comprises the step of receiving the e-mail notifications at a handheld computer from the e-mail service system over the second communications link; and
the step of retrieving e-mail messages at the given local client device from the e-mail service system over the first communications link comprises the step of retrieving e-mail messages at a handheld computer from the e-mail service system over the first communications link.

97. The method defined in claim 77 wherein the step of retrieving e-mail messages at the given local client device from the e-mail service system over the first communications link further comprises the step of automatically retrieving an e-mail message at the given local client device from the e-mail service system over the first communications link after an associated e-mail notification has been provided by the e-mail service system over the second communications link.

98. The method defined in claim 77 wherein the step of retrieving e-mail messages by the given local client device from the e-mail service system over the first communications link further comprises the step of providing a user with the opportunity to retrieve an e-mail message at the given local client device from the e-mail service system over the first communications link after an associated e-mail notification is provided by the e-mail service system over the second communications link.

99. The method defined in claim 55 wherein: the step of providing e-mail notifications from the e-mail service system to the given local client device from among the local client devices over the second communications link comprises the step of providing e-mail notifications from the e-mail service system to the given local client device over a second communications link using a second bandwidth;
the step of receiving the e-mail notifications at the given local client device from the e-mail service system over the second communications link comprises the step of receiving the e-mail notifications at the given local client device from the e-mail service system over the second communications link using the second bandwidth; and
the step of retrieving e-mail messages at the given local client device from the e-mail service system over the first communications link comprises the step of retrieving e-mail messages at the given local client device from the e-mail service system over a first communications link using a first bandwidth that is greater than the second bandwidth.

100. The method defined in claim 55 wherein:
the step of providing e-mail notifications from the e-mail service system to the given local client device from among the local client devices over the second communications link comprises the step of providing e-mail notifications from the e-mail service system to the given local client device over a unidirectional second communications link;
the step of receiving the e-mail notifications at the given local client device from the e-mail service system over the second communications link comprises the step of receiving the e-mail notifications at the given local client device from the e-mail service system over the unidirectional second communications link; and
the step of retrieving e-mail messages at the given local client device from the e-mail service system over the first communications link comprises the step of retrieving e-mail messages at the given local client device from the e-mail service system over a bidirectional first communications link.

101. The method defined in claim 55 wherein:
the step of providing e-mail notifications from the e-mail service system to the given local client device from among the local client devices over the second communications link comprises the step of providing e-mail notifications from the e-mail service system to the given local client device over a unidirectional second communications link; and
the step of receiving the e-mail notifications at the given local client device from the e-mail service system over the second communications link comprises the step of receiving the e-mail notifications at the given local client device from the e-mail service system over the unidirectional second communications link.

102. The method defined in claim 55 wherein the step of retrieving e-mail messages at the given local client device from the e-mail service system over the first communications link comprises the step of retrieving e-mail messages at the given local client device from the e-mail service system over an occasional first communications link.

103. The method defined in claim 55 wherein:
the step of providing e-mail notifications from the e-mail service system to the given local client device from among the local client devices over the second communications link comprises the step of providing e-mail notifications from the e-mail service system to the given local client device over a continuous second communications link;
the step of receiving the e-mail notifications at the given local client device from the e-mail service system over the second communications link comprises the step of receiving the e-mail notifications at the given local client device from the e-mail service system over the continuous second communications link.

104. The method defined in claim 55 wherein:

the step of providing e-mail notifications from the e-mail service system to the given local client device from among the local client devices over the second communications link comprises the step of providing e-mail notifications from the e-mail service system to the given local client device over a unidirectional and continuous second communications link using a second bandwidth;

the step of receiving the e-mail notifications at the given local client device from the e-mail service system over the second communications link comprises the step of receiving the e-mail notifications at the given local client device from the e-mail service system over the unidirectional and continuous second communications link using the second bandwidth; and the step of retrieving e-mail messages by the given local client device from the e-mail service system over the first communications link comprises the step of retrieving e-mail messages by the given local client device from the e-mail service system over a bidirectional and occasional first communications link using a first bandwidth that is greater than the second bandwidth.

* * * * *